US012675254B2

(12) United States Patent
Agrawal et al.

(10) Patent No.: US 12,675,254 B2
(45) Date of Patent: Jul. 7, 2026

(54) ELECTRONIC DEVICE WITH EARPHONE/HEADPHONE RECOMMENDATION BASED ON CONTEXTUAL USAGE OF WEARABLE AUDIO OUTPUT DEVICE(S)

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 75 days.

(21) Appl. No.: 18/614,688

(22) Filed: Mar. 24, 2024

(65) Prior Publication Data

US 2025/0298574 A1    Sep. 25, 2025

(51) Int. Cl.
 G06F 3/16          (2006.01)
(52) U.S. Cl.
 CPC .................................... G06F 3/162 (2013.01)
(58) Field of Classification Search
 None
 See application file for complete search history.

(56) References Cited

U.S. PATENT DOCUMENTS 10,296,954 B1    5/2019  Mishra et al.
2008/0235853 A1*  10/2008  Sousa ..................... A61F 11/06
                                                    2/209

2014/0193001 A1    7/2014  Oishi
2019/0245635 A1    8/2019  Verkasalo et al.
2021/0174971 A1    6/2021  Jain et al.
2022/0109932 A1    4/2022  Felton et al.
2022/0150617 A1*  5/2022  Backe ........................ A61L 2/26
2022/0217462 A1*  7/2022  Panecki ................... H04R 1/22
2023/0247340 A1*  8/2023  Lee ........................ H04R 1/105
                                                    381/328
2023/0254629 A1    8/2023  Ishibashi
2024/0098607 A1    3/2024  Srinivasan et al.
2024/0373181 A1   11/2024  Lundbäck
2025/0029632 A1    1/2025  Park et al.

FOREIGN PATENT DOCUMENTS

CN       108270913 A    7/2018
CN       110764730 A    2/2020

* cited by examiner

*Primary Examiner* — Hemant S Patel
(74) *Attorney, Agent, or Firm* — Isidore PLLC

(57)                ABSTRACT

An electronic device, method and computer program product provide recommending wearable audio output devices (e.g., earphones, headsets) for audio output that are appropriate for the ambient sound context and sound quality of the audio output. A controller of the electronic device monitors the context, associates a respective air leakage value and a respective ambient sound attenuation value associated with each wearable audio output device. In response to use of a wearable audio output device exceeding a duration threshold, the controller identifies and presents a recommendation to switch to a candidate wearable audio output device to mitigate a risk level while successfully presenting the audio output for the context.

20 Claims, 9 Drawing Sheets

401

| Wearable Audio Output Device | Air Leakage (between 0° – 100°) | Sound Attenuation (between 0° – 100°) | Sound Quality (between 0° – 100°) |
|---|---|---|---|
|  (A) 306a | 5% | 30% | 35% |
| B 306b | Right Ear:: 50% Left Ear: 100% | Right Ear: 50% Left Ear: 0% | Right Ear: 55% Left Ear: 0% |
| C 306c | 60% | 80% | 90% |

401

| Wearable Audio Output Device | Air Leakage (between 0° – 100°) | Sound Attenuation (between 0° – 100°) | Sound Quality (between 0° – 100°) |
|---|---|---|---|
| A 306a  | 5% | 30% | 35% |
| B 306b | Right Ear:: 50% Left Ear: 100% | Right Ear: 50% Left Ear: 0% | Right Ear: 55% Left Ear: 0% |
| C 306c | 60% | 80% | 90% |

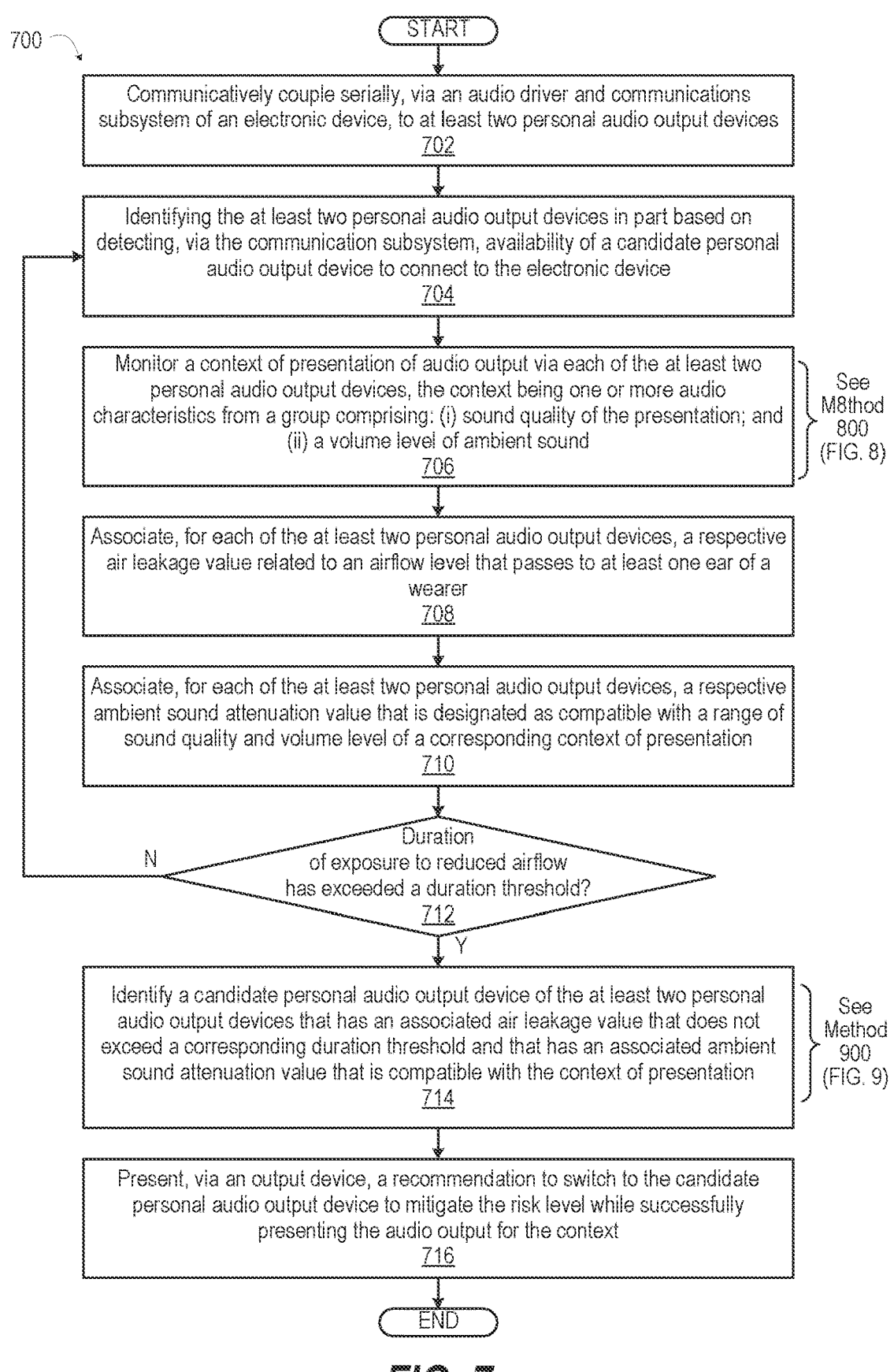

700

START

Communicatively couple serially, via an audio driver and communications subsystem of an electronic device, to at least two personal audio output devices
702

Identifying the at least two personal audio output devices in part based on detecting, via the communication subsystem, availability of a candidate personal audio output device to connect to the electronic device
704

Monitor a context of presentation of audio output via each of the at least two personal audio output devices, the context being one or more audio characteristics from a group comprising: (i) sound quality of the presentation; and (ii) a volume level of ambient sound
706

See M8thod 800 (FIG. 8)

Associate, for each of the at least two personal audio output devices, a respective air leakage value related to an airflow level that passes to at least one ear of a wearer
708

Associate, for each of the at least two personal audio output devices, a respective ambient sound attenuation value that is designated as compatible with a range of sound quality and volume level of a corresponding context of presentation
710

Duration of exposure to reduced airflow has exceeded a duration threshold?
712

N

Y

Identify a candidate personal audio output device of the at least two personal audio output devices that has an associated air leakage value that does not exceed a corresponding duration threshold and that has an associated ambient sound attenuation value that is compatible with the context of presentation
714

See Method 900 (FIG. 9)

Present, via an output device, a recommendation to switch to the candidate personal audio output device to mitigate the risk level while successfully presenting the audio output for the context
716

END

FIG. 7

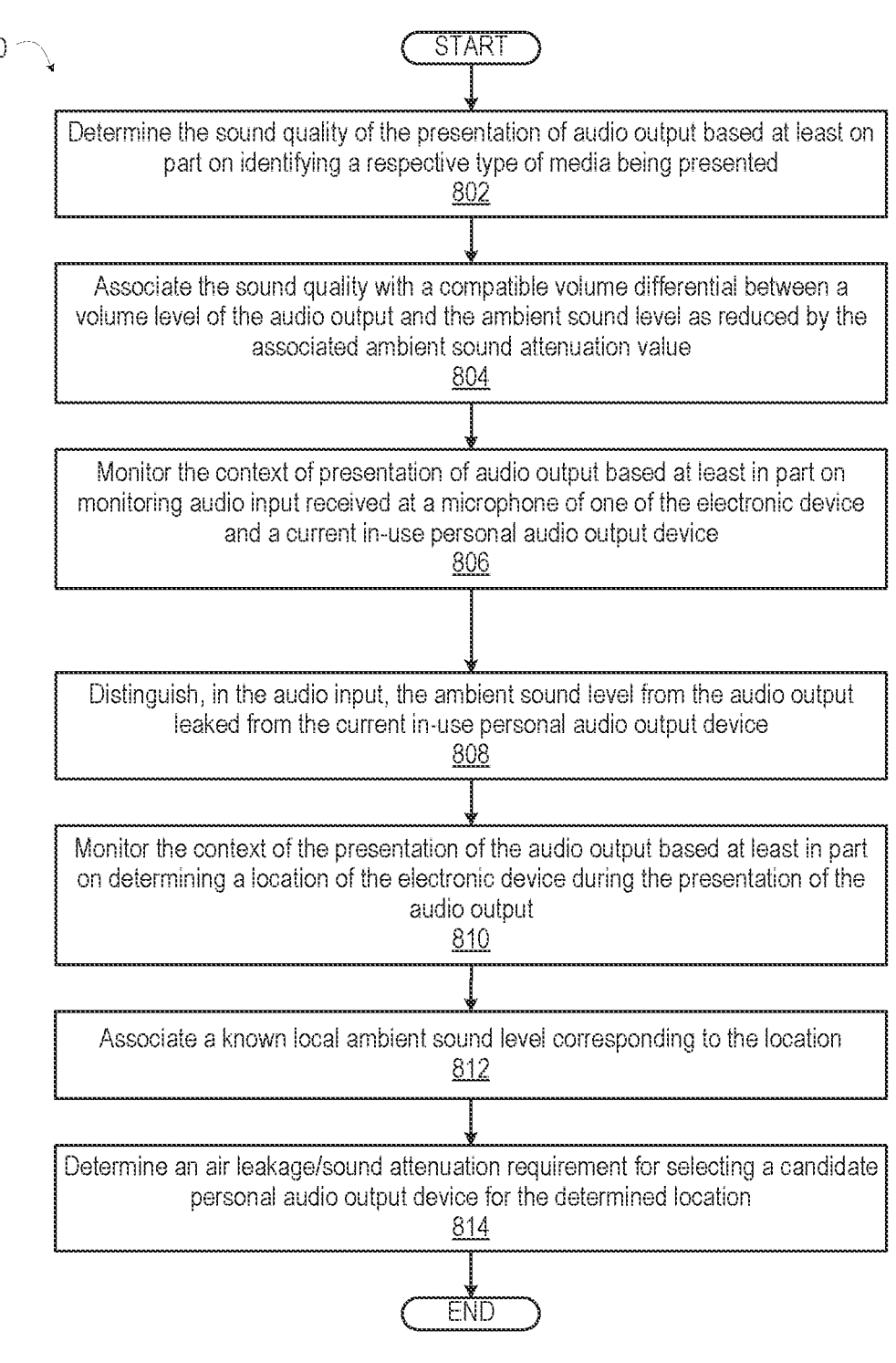

800

START

Determine the sound quality of the presentation of audio output based at least on part on identifying a respective type of media being presented
802

Associate the sound quality with a compatible volume differential between a volume level of the audio output and the ambient sound level as reduced by the associated ambient sound attenuation value
804

Monitor the context of presentation of audio output based at least in part on monitoring audio input received at a microphone of one of the electronic device and a current in-use personal audio output device
806

Distinguish, in the audio input, the ambient sound level from the audio output leaked from the current in-use personal audio output device
808

Monitor the context of the presentation of the audio output based at least in part on determining a location of the electronic device during the presentation of the audio output
810

Associate a known local ambient sound level corresponding to the location
812

Determine an air leakage/sound attenuation requirement for selecting a candidate personal audio output device for the determined location
814

END

FIG. 8

ELECTRONIC DEVICE WITH EARPHONE/HEADPHONE RECOMMENDATION BASED ON CONTEXTUAL USAGE OF WEARABLE AUDIO OUTPUT DEVICE(S)

BACKGROUND

1. Technical Field

The present disclosure relates generally to electronic devices that present audio output, and more particularly, to electronic devices that present the audio output via audio output devices in direct contact with ear(s) of a user.

2. Description of the Related Art

Over the past decade, wearable audio devices have witnessed an exponential surge in user adoption. From the introduction of Bluetooth earpieces to the widespread popularity of true wireless earphones and smart headphones, these audio devices have become integral to daily life. The convenience, portability, and advancements in audio technology have fueled this trend. Users now often own multiple wearable audio devices, catering to various needs such as fitness, leisure, and work. These devices seamlessly integrate with an array of computing gadgets-smartphones, tablets, laptops, and smartwatches—creating a unified audio ecosystem. Bluetooth connectivity allows effortless pairing across devices, enabling users to switch between devices without interruptions. The rise of voice assistants like Siri, Alexa, and Google Assistant has further amplified the utility of these wearables, transforming the voice assistants into smart hubs for managing tasks, receiving notifications, and controlling other connected devices. As people increasingly embrace a multitasking lifestyle, the demand for wearable audio technology continues to soar, fostering innovation and enhancing the way users interact with their digital environments.

Continuous use of earphones carries substantial risks to hearing health. Prolonged exposure to high decibel audio levels can lead to potential hearing loss and various ear-related issues. In an example, moisture and limited ventilation caused by earphone use create an environment ripe for bacterial growth, elevating the risk of infections like otitis externa. This condition, characterized by inflammation and potential bacterial or fungal development, poses significant discomfort and health risks. Additionally, the constant pressure and friction from earphone buds can irritate the delicate ear canal, causing itching, discomfort, and even abrasions. While over-the-ear headphones distribute pressure differently, improper hygiene and extended use can still contribute to similar problems. Users, often enamored with the convenience, overlook the cumulatively negative impact on their hearing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 is a flow diagram presenting an example method of recommending a wearable audio output device (e.g., earphone, headset) that is appropriate for one or more of an ambient sound context and a sound quality of an audio output to be presented, according to one or more embodiments;

FIG. 8 is a flow diagram of method of determining sound quality requirements for selecting an appropriate wearable audio output device, according to one or more embodiments.

DETAILED DESCRIPTION

Figure 1:
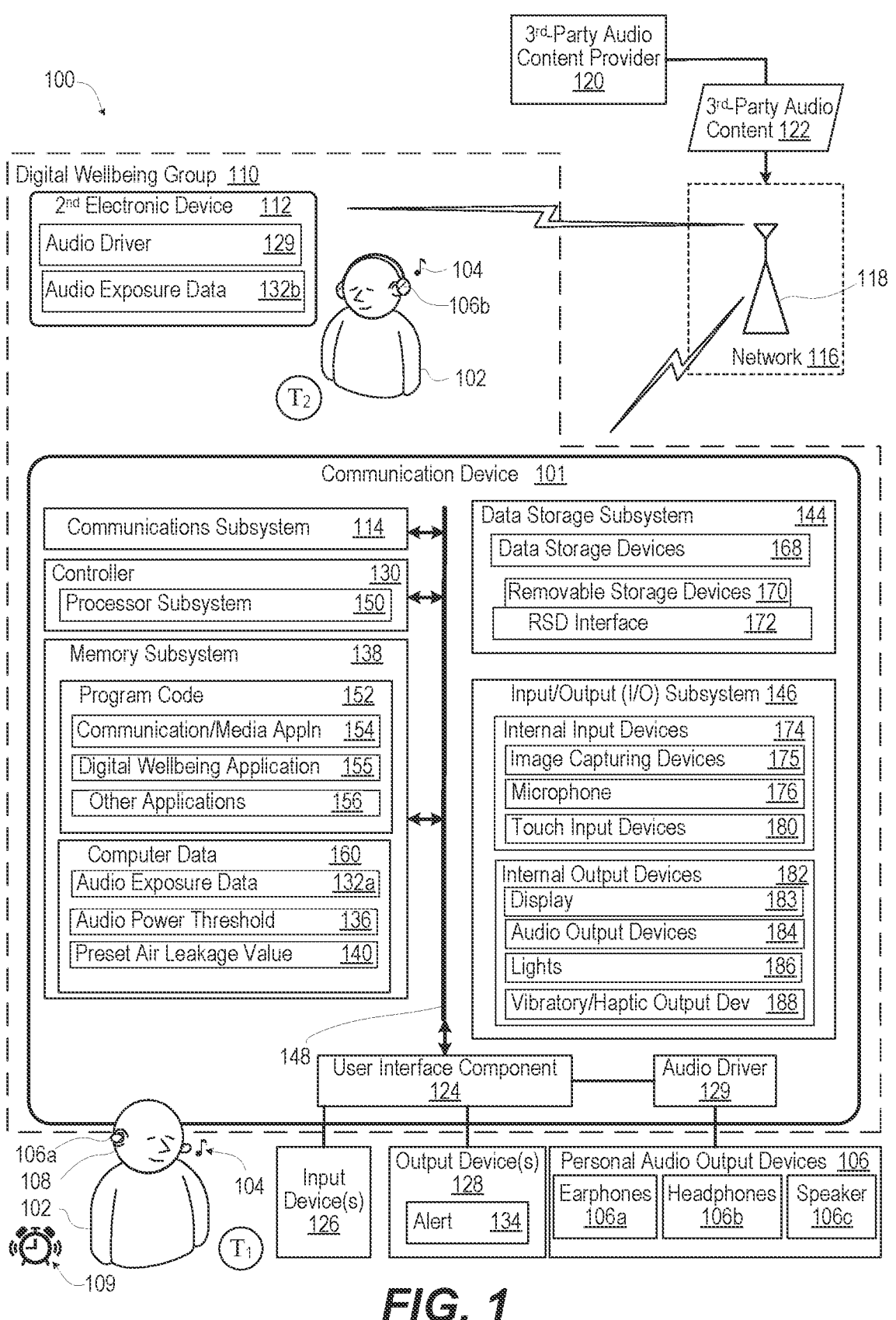
FIG. 1 presents a functional block diagram of an example electronic device that performs digital wellbeing management based on duration of using wearable audio output devices, according to one or more embodiments.

According to aspects of the present disclosure, an electronic system, a method, and a computer program product recommend wearable audio output devices (e.g., earphones, headsets) for audio output that are appropriate for the ambient sound context and sound quality of the audio output. In one or more embodiments, the electronic device includes an audio driver configured to communicatively couple serially to at least two wearable audio output devices. A controller of the electronic device is communicatively coupled to the audio driver. The controller monitors a context of presentation of audio output via each of the at least two wearable audio output devices. The context is one or more audio characteristics from a group comprising: (i) sound quality of the presentation; and (ii) a volume level of ambient sound. The controller associates, for each of the at least two wearable audio output devices, a respective air leakage value related to an airflow level that passes to at least one ear of a wearer, a duration of exposure to reduced airflow level being related to risk level for moisture-related bacterial growth in the at least one ear. The controller associates, for each of the at least two wearable audio output devices, a respective ambient sound attenuation value that is designated as compatible with a range of sound quality and volume level of a corresponding context of presentation. In response to determining that the duration of exposure to reduced airflow level of a current one of the at least two wearable audio output devices has exceeded a duration threshold, the controller identifies a candidate wearable audio output device of the at least two wearable audio output devices that has an associated air leakage value that does not exceed a corresponding duration threshold and that has an associated ambient sound attenuation value that is compatible with the context of presentation. The controller presents, via an output device, a recommendation to switch to the candidate wearable audio output device to mitigate the risk level, while successfully presenting the audio output for the context.

Aspects of the present disclosure provide digital wellbeing management during use of wearable audio output devices that reduce or preclude air flow to ear canal(s) of a user who is listening to audio output. In one or more embodiments, the present disclosure may provide for determining usage of a short ranged wireless audio device for audio playback from more than one electronic devices by the same user. The present disclosure may provide for associating each usage of audio playback via the wearable audio device to the user using: (a) device sensors (e.g., camera, microphone) and device account information; (b) sensors on the wearable devices which helps determine device user; and (c) explicit confirmation by the user in the absence of user's identification. The present disclosure may provide for determining the type of the wearable audio device as one the following wearable categories: (a) wired/wireless; (b) open back/semi-open headphones; (c) bone conduction headphone/on ear headphones; (d) in-ear headphones/closed ear headphones. The present disclosure may provide for determining the usage of audio wearable device in an immersive mode (i.e., audio noise cancellation (ANC) or transparent mode). The present disclosure may provide for determining the audio volume level played during each playback. The present disclosure may provide for communicating between audio source devices and accumulating total listening time for each user across all the user's audio wearable devices. The present disclosure may provide for presenting periodic usage information to a user on a per audio source device basis as well as the wearable audio device basis along with audio volume level. The present disclosure may provide for presenting an alert/warning to the user if the total playback time (e.g., for one wearable audio output device or for all wearable audio output devices) is greater than a threshold in a given time period. The present disclosure may provide for offering to pause audio playback or offering playback to an alternative audio device that is better than the current one with regard to allowing more air flow to ear(s) of the user (e.g., over the ear headphones compared to in-ear). For over-the-ear headphones, air flow may depend on surface features such as a breathable surface versus a non-breathable surface. An amount of air captured between the headphone and an ear canal may also provide a different level of exposure.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic system that includes or is wholly provided by an electronic device, in which the features of the present disclosure are advantageously implemented for monitoring presentation of audio output via wearable audio output device(s) directly to ear(s) of a user. Wellbeing policies are executed to present alerts responsive to the accumulated usage. In one or more embodiments, the electronic device can include additional communications functionality as communication device 101 to operate as a mobile user device in communication environment 100. Throughout the disclosure, electronic device is interchangeably referred to as communication device 101. Communication device 101 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote termi- nal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In an example, communication device 101 is operated by user 102 to listen to audio output 104 via at least one wearable audio output device 106. Wearable audio output device 106 is worn so as to direct audio output personally to one user. Wearable audio output devices 106 are generally worn on at least one ear of user 102 or worn on a head of user 102 and positioned proximate or overtop of at least one ear of user 102. User 102 may own wearable audio device 106 or merely have permission to use wearable audio device 106. In an example, one wearable audio output device is depicted at time "$T_1$" as an in-ear wearable audio output device(s), such as earphones 106a that has a low air leakage value. Earphones 106a substantially reduce or wholly preclude airflow to ear(s) 108 of user 102. Prolong audio exposure to earphones 106a may be undesirable due to effects of the audio sound itself and/or increased moisture levels within the ear encouraging bacterial growth. Another audio output device is depicted at time "$T_2$" as an over-the-ear wearable audio output device, such as headphone 106b, which has a moderate air leakage value. Headphone 106b may reduce airflow to ear(s) 108 of user 102 to a lesser degree than earphones 106a. Sufficiently prolonged audio exposure to earphones 106a may be undesirable due to effects of the audio sound itself and/or increased moisture levels within the ear encouraging bacterial growth. Switching from ear- phone 106a to headphone 106b may enable a longer period of time of usage without detrimental effect. However, the higher air leakage value of headphone 106b may not be operatively appropriate in the presence of loud ambient noise 109.

Aspects of the present disclosure may be implemented across a digital wellbeing group 110 of devices, such as including communication device 101 and at least one second electronic device 112. Communication device 101 includes communications subsystem 114 that enables communication device 101 to connect or link over network 116, which includes node 118, to other devices within digital wellbeing group 110 (e.g., at least one second electronic device 112). Node 118 may represent a wireless access point, a cellular radio access network, a wired network interface, an over- the-air relay or repeater, or other communication link. Com- munication device 101 can communicatively couple to at least one third-party audio content provider 120 via network 116 to receive third-party audio content 122. Communica- tion device 101 includes at least one user interface compo- nent 124 configured to receive user inputs (e.g., touch, gesture, sound) via one or more input device 126 and to present outputs (e.g., light, sound, vibration) via one or more output devices 128. In addition to earphones 106a and headphones 106b, an example of output device 128 is an air-gapped audio output device such as audio speaker 106c. Speaker 106c provide an alternative way of presenting audio output (other than wearable audio output devices (106a and 106b) that does not limit airflow to ear(s) 108 (i.e., has a high air leakage value). Although speaker 106c may not present an airflow restriction, speaker 106c may not be a viable alternative to a wearable audio output device (106a-106b). In an example, some locations may not be suitable for effective use of output device 128 for audio presentation due to presence of ambient noise 109 or proximity to other people.

In one or more embodiments, communication device 101 includes audio driver 129 configured to communicatively couple and transmit audio output to at least one wearable audio output device 106. Controller 130 is communicatively coupled to audio driver 129 to monitor presentation of audio output 104 via each of the at least one wearable audio output device 106 to obtain audio exposure data 132a originating at communication device 101. Controller 130 compares a total time of audio exposure to user 102 via each of at least one wearable audio output device 106 presenting audio output 104 with a corresponding audio exposure threshold within an exposure period of time. Controller 130 presents alert 134 via output device(s) 128 in response to the total time of audio exposure exceeding the audio exposure threshold. In an example, alert 134 is presented by wearable audio output device 106 that is currently worn by user 102. Alternatively, or in addition, alert 134 is visually presented by output device 128, which is a display. Alert 134 may provide a prompt to pause audio output 104. Controller 130 pauses the presentation of audio output 104 on a current one of at least one wearable audio output device 106, in response to receiving a corresponding input via input device 126 to pause or switch audio output device.

In one or more embodiments, communication device 101 communicates, via communications subsystem 114 with at least one second electronic device 112 that also presents audio output 104 via one or more of at least one wearable audio output device 106. Controller 130 associates, with a first user (102), communication device 101 and at least one second electronic device 112 as part of digital wellbeing group 1. At least one second electronic device 112 present second audio output via one or more of at least one wearable audio output devices 106 for listening by the first user (102). Controller 130 receives, via communications subsystem 114 from at least one second electronic device 112, audio expo- sure data 132b originating at second electronic device 112. Controller 130 determines the total time of the audio expo- sure to user 102 by aggregating audio exposure data 132a- 132b originating at communication device 101 and at least one second electronic device 112. In one or more particular embodiments, controller 130 transmits, via communications subsystem 114, audio exposure data 132a originating at communication device 101 to at least one second electronic device 112 to enable at least one second electronic device 112 to aggregate audio exposure data 132a-132b originating respectively at communication device 101 and at least one second electronic device 112. The at least one second electronic device 112 is further enabled to generate a sub- sequent alert in response to a second total time of audio exposure exceeding the audio exposure threshold.

In one or more embodiments, controller 130 monitors audio power level of audio output 104. Controller 130 compares the audio power level to audio power threshold 136 contained in memory subsystem 138 of communication device 101. Controller 130 aggregates the audio exposure total based at least in part on the audio power level being above audio power threshold 136. In one or more embodiments, controller 130 maintains subtotal values for audio exposure duration for each of at least two wearable audio output devices 106 (e.g., earphones 106a and headphone 106b). Controller 130 identifies a respective air leakage value and audio exposure threshold for each wearable audio output device (106a-106b). Controller 130 compares each respective audio exposure threshold to the subtotal value for a corresponding wearable audio output device (106a-106b) during the exposure period of time. Controller 130 presents alert 134 via output device 128 to pause audio output 104 in response to the total time of audio exposure for any one of the at least two wearable audio output devices (106a-106b) exceeding the respective audio exposure threshold for the respective one of at least two wearable audio output devices (106a-106b).

In one or more embodiments, controller 130 maintains subtotal values for audio exposure duration for each of the at least two wearable audio output devices (106a-106b). Controller 130 identifies a respective air leakage value and audio exposure threshold for each wearable audio output device (106a-106b). Controller 130 compares the respective audio exposure threshold to the subtotal values during the exposure period of time. Controller 130 presents alert 134 via output device 128 to switch to another wearable audio output device 106 in response to the total time of audio exposure exceeding the respective audio exposure threshold for the respective one of two wearable audio output devices (106a-106b).

In one or more embodiments, communication device 101 includes memory subsystem 138 containing preset air leakage value 140 associated with a preset audio exposure threshold. In response to determining that two or more wearable audio output devices (106a-106b) having different air leakage values are used during the exposure period of time, controller 130 maintains subtotal values for audio exposure duration for each of wearable audio output devices (106a-106b). Controller 130 assigns a proportional weight to a respective duration of audio exposure for each of two or more wearable audio output devices (106a-106b) in relation to a ratio of the corresponding air leakage value to the preset air leakage value to normalize the respective durations. Controller 130 aggregates the weighted durations of audio exposure to a total audio exposure value. Controller 130 compares the total audio exposure value to the preset audio exposure threshold. Controller 130 presents alert 134 via output device 128 in response to the total time of audio exposure contributed by two or more wearable audio output devices (106a-106b) exceeding the preset audio exposure threshold.

Controller 130 includes processor subsystem 150, which includes one or more central processing units (CPUs) or data processors. Processor subsystem 150 can include one or more digital signal processors that can be integrated with data processor(s). Processor subsystem 150 can include other processors such as auxiliary processor(s) that may act as a low power consumption, always-on sensor hub for physical sensors. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

In an example, a first wearable audio output device has an audio exposure threshold of 90 minute and a first subtotal of usage of 60 minutes. A second wearable audio output device has an audio exposure threshold of 180 minutes and a second subtotal value of usage of 60 minutes. To aggregate the subtotals in one scenario, the second subtotal is normalized based on the threshold ratios being 1:2. The second subtotal is weighted to 30 minutes and added to the first subtotal of 60 minutes for a total of 90 minutes to compare to the first exposure threshold of 90 minutes. The usage of the two wearable audio output devices meets the exposure threshold. Alternatively, the first subtotal of 60 minutes could be weighted to 120 minutes, added to the second subtotal of 60 minutes to total 180 minutes, which meets the second exposure threshold of 180 minutes.

In addition to communications subsystem 114, controller 130, and memory subsystem 138, communication device 101 may include data storage subsystem 144 and input/output (I/O) subsystem 146. To enable management by controller 130, system interlink 148 communicatively connects controller 130 with communications subsystem 114, memory subsystem 138, data storage subsystem 144 and I/O subsystem 146. System interlink 148 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 148) are illustrated in FIG. 1, it is to be understood that more, fewer, or different interconnections may be present in other embodiments.

Controller 130 may include artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output.

Memory subsystem 138 stores program code 152 for execution by processor subsystem 150 to provide the functionality described herein. Program code 152 includes applications such as communication/media application 154 that provide audio output 104. Program code 152 may include digital wellbeing application 155 that tracks usage of wearable audio output devices 106, and include other applications 156. These applications/modules may be software or firmware that, when executed by controller 130, causes controller 130 to configure communication device 101 to provide functionality described herein.

In one or more embodiments, several of the described aspects of the present disclosure are provided via executable program code of applications executed by controller 130. In one or more embodiments, program code 152 may be integrated into a distinct chipset or hardware module as firmware that operates separately from executable program code. Portions of program code 152 may be incorporated into different hardware components that operate in a distributed or collaborative manner. Memory subsystem 138 further includes operating system (OS), firmware interface, such as basic input/output system (BIOS) or Uniform Extensible Firmware Interface (UEFI), and firmware, which also includes and may thus be considered as program code 152.

Program code 152 may access, use, generate, modify, store, or communicate computer data 160, such as audio power threshold 136 and preset air leakage value 140. Computer data 160 may incorporate "data" that originated as raw, real-world "analog" information that consists of basic facts and figures. Computer data 160 includes different forms of data, such as numerical data, images, coding, notes, and financial data. Computer data 160 may originate at communication device 101 or be retrieved from a remote device via communications subsystem 114. Communication device 101 may store, modify, present, or transmit computer data 160 such as audio exposure data 132*a*-132*b*. Computer data 160 may be organized in one of a number of different data structures. Common examples of computer data 160 include video, graphics, text, and images. Computer data 160 can also be in other forms of flat files, databases, and other data structures.

Data storage subsystem 144 of communication device 101 includes data storage device(s) 168. Controller 130 is communicatively connected, via system interlink 148, to data storage device(s) 168. Data storage subsystem 144 provides program code 152 and computer data 160 stored on non-volatile storage that is accessible by controller 130. For example, data storage subsystem 144 can provide a selection of program code 152 and computer data 160. These applications can be loaded into memory subsystem 138 for execution/processing by controller 130. In one or more embodiments, data storage device(s) 168 can include hard disk drives (HDDs), optical disk drives, and/or solid-state drives (SSDs), etc. Data storage subsystem 144 of communication device 101 can include removable storage device(s) (RSD(s)) 170, which is received in RSD interface 172. Controller 130 is communicatively connected to RSD 170, via system interlink 148 and RSD interface 172. In one or more embodiments, RSD 170 is a non-transitory computer program product or computer readable storage device that may be executed by a processor associated with a user device such as communication device 101. Controller 130 can access data storage device(s) 168 or RSD 170 to provision communication device 101 with program code 152 and computer data 160.

I/O subsystem 146 may include internal input devices 174 such as image capturing device(s) 175, microphone 176, and touch input devices 180 (e.g., screens, keys, or buttons). I/O subsystem 146 may include internal output devices 182 such as display 183, audio output devices 184, lights 186, and vibratory or haptic output devices 188.

In one or more embodiments, controller 130, via communications subsystem 114, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 114 includes a global positioning system (GPS) module that receives GPS broadcasts from GPS satellites to obtain geospatial location information. In one or more embodiments, controller 130, via communications subsystem 114, communicates via a wireless local area network (WLAN) link using one or more IEEE 802.11 WLAN protocols with an access point. In one or more embodiments, controller 130, via communications subsystem 114, may communicate via an OTA cellular connection with radio access networks (RANs). In an example, communication device 101, via communications subsystem 114, connects via RANs of a terrestrial network that is communicatively connected to a network server.

According to aspects of the present disclosure, an electronic device such as communication device 101 includes audio driver 129 configured to communicatively couple serially to at least two wearable audio output devices (e.g., earphone 106*a* and headphone 106*b*). Controller 130 is communicatively coupled to audio driver 129. Controller 130 monitors a context of presentation of audio output 104 via each of the at least two wearable audio output devices (106*a*-106*b*). The context is one or more audio characteristics of a group including: (i) sound quality of the presentation; and (ii) a volume level of ambient sound. Controller 130 associates, for each of the at least two wearable audio output devices (106*a*-106*b*), a respective air leakage value related to an airflow level that passes to at least one ear 108 of a wearer (e.g., user 102). A duration of exposure to reduced airflow level is related to risk level for moisture-related bacterial growth in at least one ear 108. The correlation may be direct or indirect. The relationship may be linear or nonlinear and may vary based on ambient temperature and humidity conditions. The correlation may depend on the susceptibility of particular users. Controller 130 associates, for each of the at least two wearable audio output devices (106*a*-106*b*), a respective ambient sound attenuation value that is designated as compatible with a range of sound quality and volume level of a corresponding context of presentation. In response to determining that the duration of exposure to reduced airflow level of a current one of the at least two wearable audio output devices (106*a*-106*b*) has exceeded a duration threshold, controller 130 identifies a candidate wearable audio output device of the at least two wearable audio output devices (106*a*-106*b*) that has an associated air leakage value that does not exceed a corresponding duration threshold and that has an associated ambient sound attenuation value that is compatible with the context of presentation. Controller 130 presents, via output device 128, a recommendation (e.g., alert 134) to switch to the candidate wearable audio output device to mitigate the risk level while successfully presenting the audio output for the context.

In one or more embodiments, controller 130 may determine that the type of media being presented is not time critical. In an example, the media type is associated with user entertainment that may be paused. In response to determining a candidate wearable audio device is not available that has an associated air leakage value that does not exceed a corresponding duration threshold, controller 130 presents alert 134 including a recommendation to pause presentation of audio output 104.

In one or more embodiments, controller 130 may determine that the type of media presented is time critical and may not be paused. In response to determining that there is no available candidate wearable audio device that has an associated air leakage value not exceeding a corresponding duration threshold, controller 130 identifies a second candidate wearable audio output device of the at least two wearable audio output devices (106*a*-106*b*) that has an associated ambient sound attenuation value that is compatible with the context of presentation. Controller 130 presents, via output device 128, a recommendation to switch to the candidate wearable audio output device to successfully present the audio output for the context, although the risk of exposure is not mitigated. When either presentation of audio output is no longer time critical (i.e., cannot be paused) or as soon as a wearable audio output device becomes available that is satisfactory for the context, another notification may be presented to respectively pause presentation or switch wearable audio output device to mitigate the risk of exposure.

In one or more embodiments, in monitoring the context of presentation of audio output 104, controller 130 monitors audio input received at microphone 176 of one of communication device 101 and a current in-use wearable audio output device from among at least two wearable audio output devices (106a-106b). Controller 130 distinguishes, in the audio input, the ambient sound level from the audio output leaked from the current in-use wearable audio output device (106a-106b).

In one or more embodiments, in monitoring the context of the presentation of the audio output, controller 130 determines a location of communication device 101 during the presentation of audio output 104. Controller 130 associates a known local ambient sound level corresponding to the location.

In one or more embodiments, controller 130 determines the sound quality of the presentation based on identifying a respective type of media being presented. Controller 130 associates the sound quality with a compatible volume differential between a volume level of the audio output and the ambient sound level, as reduced by the associated ambient sound attenuation value.

In one or more embodiments, in response to determining that no candidate wearable audio output device is available to switch to, controller 130 presents a notification to move to another location having a lower ambient sound level. In one or more embodiments, controller 130 identifies a candidate wearable audio output device that has both: (i) an associated air leakage value that mitigates the risk level; and (ii) the associated ambient sound attenuation value to successfully present the audio output for listening by a user in the context of the lower ambient sound level at the other location. In one or more embodiments, controller 130 identifies the candidate wearable audio output device of the at least two wearable audio output devices in part based on detecting, via communications subsystem 114, availability of the candidate wearable audio output device to connect to communication device 101.

Figure 2:
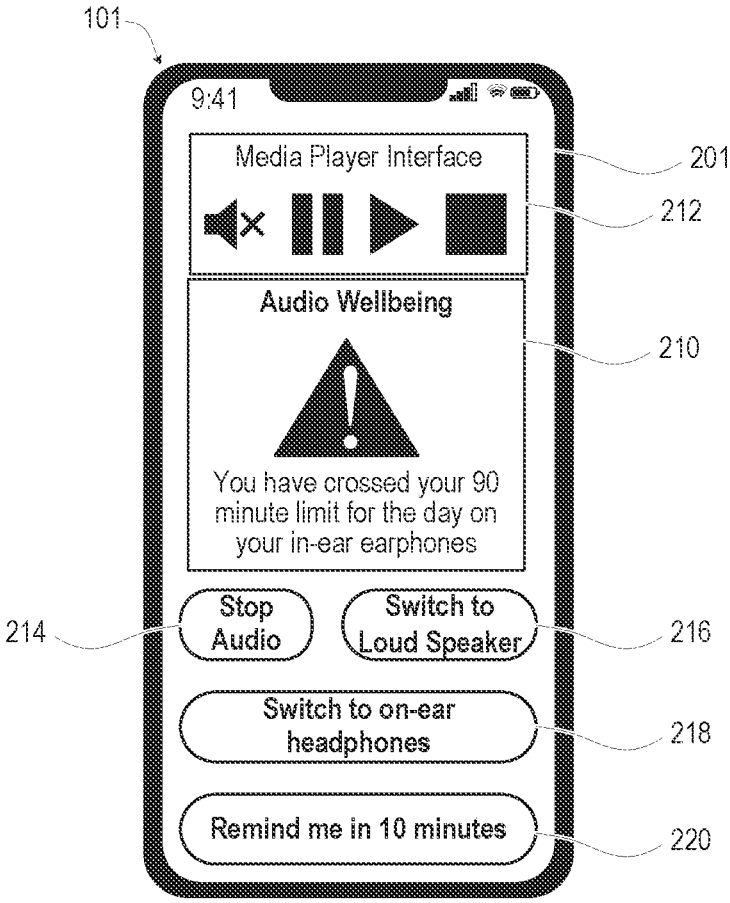
FIG. 2 presents a first view of a touch display of the electronic device presenting a notification that the user has exceeded a duration threshold for using a currently in-use wearable audio output device and enabling selectable user response options, according to one or more embodiments.

FIG. 2 is a first view of touch display 201 of communication device 101 presenting first notification GUI 210 for digital wellbeing management. In an example, touch display 201 is also visually presenting media playback application 212 that generates audio to be aurally presented by wearable audio output device (106a-106b). In an example, first notification GUI 210 is triggered by a duration threshold of 90 minutes for the day for in-ear earphones usage. In an example, first notification GUI 210 includes stop audio control 214 that prompts and triggers stopping audio output. In an example, first notification GUI 210 includes switch to loudspeaker control 216 that prompts and triggers a switch to a loudspeaker to avoid use of a wearable audio output device. In an example, first notification GUI 210 includes switch to on-ear headphone control 218 to prompt and trigger a switch to an on-ear headphone with increased air leakage. In an example, first notification GUI 210 includes remind me in 10 minutes control 220 to provide a duration threshold for re-presenting notification GUI 210.

Figure 3:
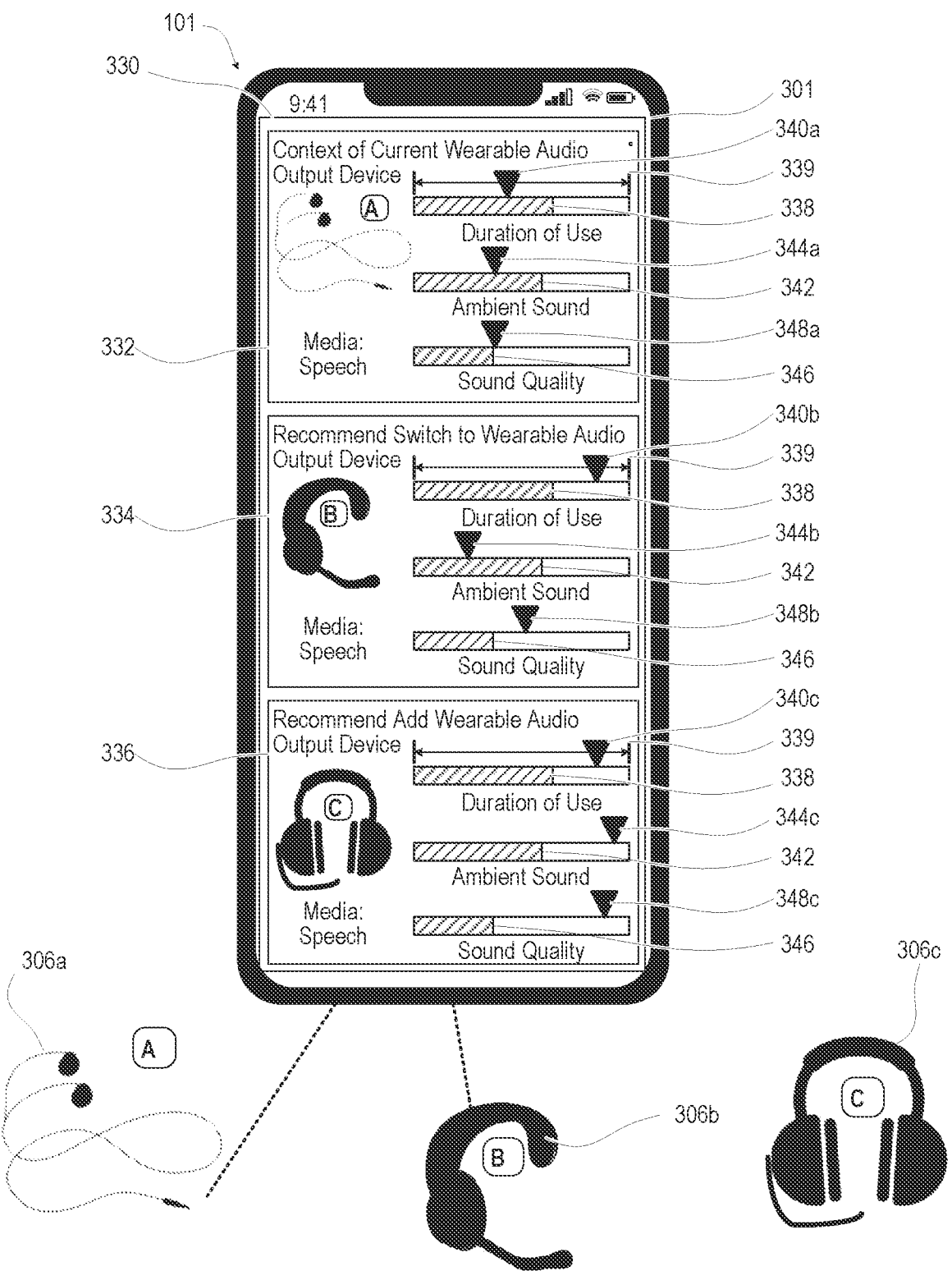
FIG. 3 presents a second view of the touch display of the electronic device presenting the notification that the user has exceeded a duration threshold for using a first wearable audio output device and recommending switching to a better second wearable audio output device or retrieving a best third wearable audio output device, according to one or more embodiments.

FIG. 3 is a second view of touch display 301 of communication device 101 presenting second notification GUI 330 for digital wellbeing management. In an example, communication device 101 determines that first wearable audio output device 306a ("A"), which is a wired earphone, is currently presenting audio output. The type of audio media being presented is speech (e.g., podcast or two-way communication session). Notification GUI 330 includes current context window 332, recommended accessible device window 334, and recommended retrievable device window 336. Current context window 332 identifies wearable audio output device 306a as having aggregated duration of use subtotal 338 during period of time 339 that is greater than exposure threshold 340a associated with air leakage characteristic of first wearable audio output device 306a. Ambient sound value 342 is greater than first attenuation characteristic 344a of wearable audio output device 306a. Sound quality requirement 346 of the audio output of the speech meets first quality characteristic 348a of first wearable audio output device 306a. In an example, recommended accessible device window 334 identifies second wearable audio output device 306b ("B") has exposure threshold 340b associated with a higher air leakage characteristic of second wearable audio output device 306b. Communication device 101 determines that second wearable audio output device 306b is accessible based on being currently connectable or recently connected in the same location. Communication device 101 determines that second wearable audio output device 306b is recommended based on having additional duration of use available before reaching exposure threshold 340b. However, ambient sound value 342 is greater than second attenuation characteristic 344b of second wearable audio output device 306b. In addition, sound quality requirement 346 of the audio output of the speech is not satisfied by second quality characteristic 348b of second wearable audio output device 306b. As a result, recommended retrievable device window 336 recommends retrieving third wearable audio output device 306c, which is an over-both-ears headset. In addition to having a high exposure threshold 340c, third wearable audio output device 306c has third attenuation characteristic 344c that is adequate for ambient sound value 342 and has third quality characteristic 348c that is adequate for sound quality requirement. Communication device 101 may determine that third wearable audio output device 306c is retrievable based on a prior connection at a different location.

Figure 4:
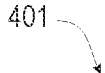
FIG. 4 is an example table of airflow leakage, sound attenuation, and sound quality characteristics of the first, second and third wearable audio output device, according to one or more embodiments.

FIG. 4 is a table 401 of example characteristics used for digital wellbeing management for wearable audio output devices (e.g., earphones, headphones). First wearable audio output device 306a has a first airflow leakage value of 5% (i.e., 95% reduction from not wearing anything over or in the ear), a first sound attenuation value of 30% (i.e., 30% of the ambient sound is removed), and first sound quality characteristics of 35% (i.e., the reproduced frequency/amplitude has a 35% correlation with the original). Second wearable audio output devices 306b has a second airflow leakage value of 50% for the right ear and 100% for the left ear, a second sound attenuation value of 50% for the right ear and 0% for the left ear, and a second sound quality characteristics of 55% for the right ear and 0% for the left ear. Third wearable audio output devices 306c has a third airflow leakage value of 60%, a third sound attenuation value of 80%, and a third sound quality characteristics of 90%. In an example, a range of 0-35% is deemed "Low", a range of 36-70% is deemed "Moderate", and a range of 71-100% is deemed "High".

Figure 5:
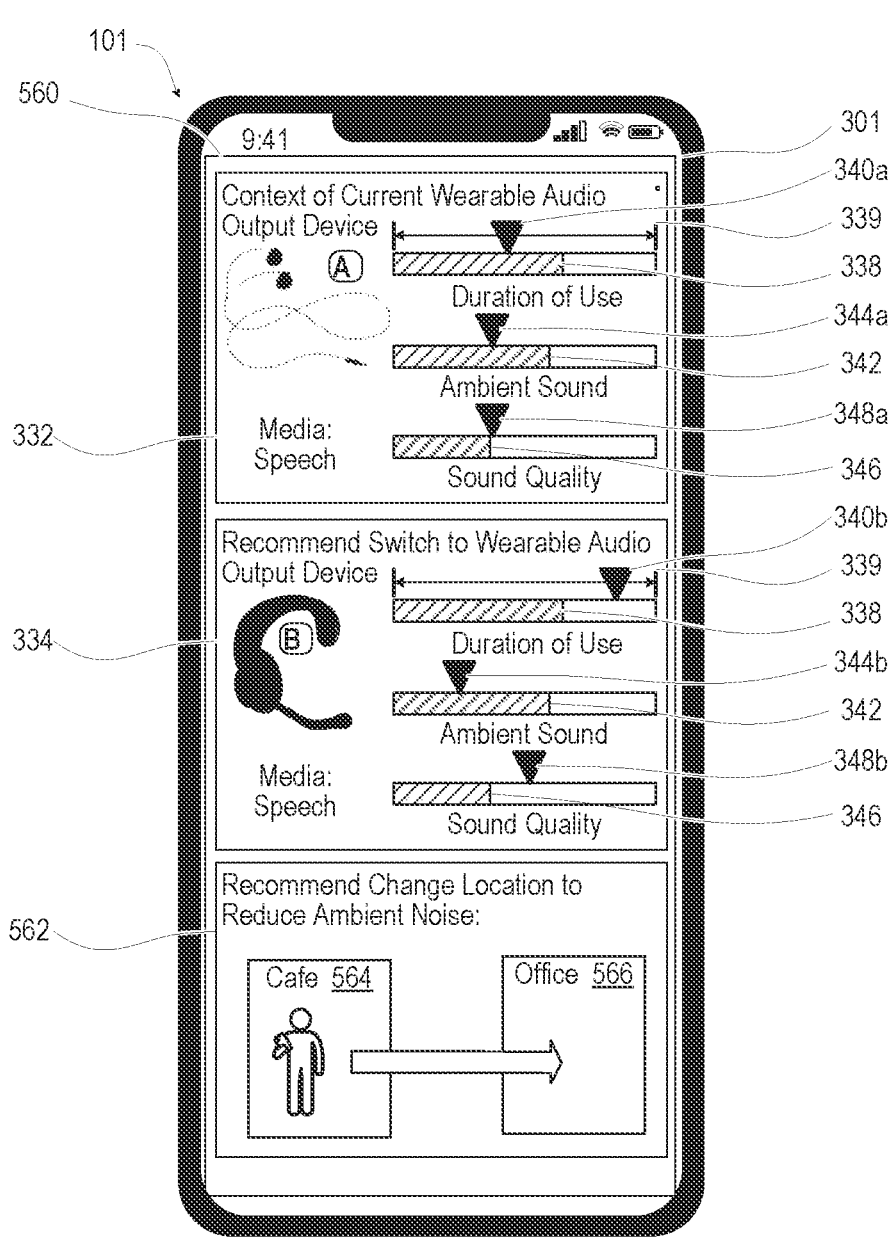
FIG. 5 presents a third view of the touch display of the electronic device presenting a notification that the user has exceeded a duration threshold for using the first wearable audio output device and recommending switching to a better second wearable audio output device or changing location to where ambient sound is less or where the best third wearable audio output device is retrievable, according to one or more embodiments.

FIG. 5 presents a third view of touch display 301 of communication device 101 presenting third notification GUI 560 for digital wellbeing management. In an example, third notification GUI 560 includes current context window 332, recommended accessible device window 334, and recommended change of location window 562. In response to determining that a wearable audio output device that meets duration, attenuation and quality criteria is not currently accessible, recommended change of location window 562 presents a context of a current location, such as cafe 564, and recommends another location, such as office 566, that either has a lower ambient sound level or where a preferred wearable audio output device (e.g., third wearable audio output devices 306c of FIG. 4) is expected to be available.

Figure 6:
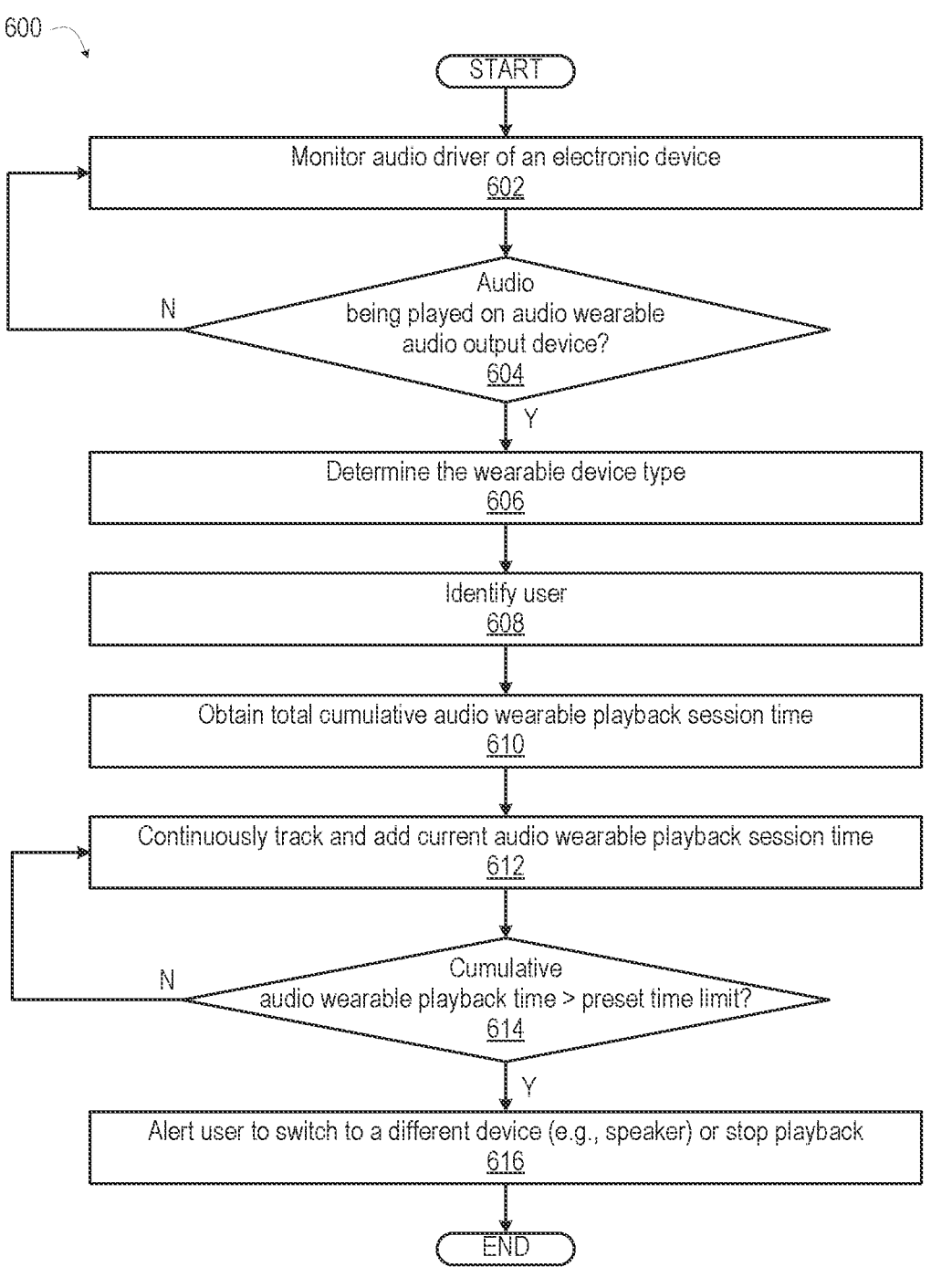
FIG. 6 is a flow diagram presenting an example method of digital wellbeing management based on context of use of connected short ranged wearable device(s), according to one or more embodiments.
Figure 9:
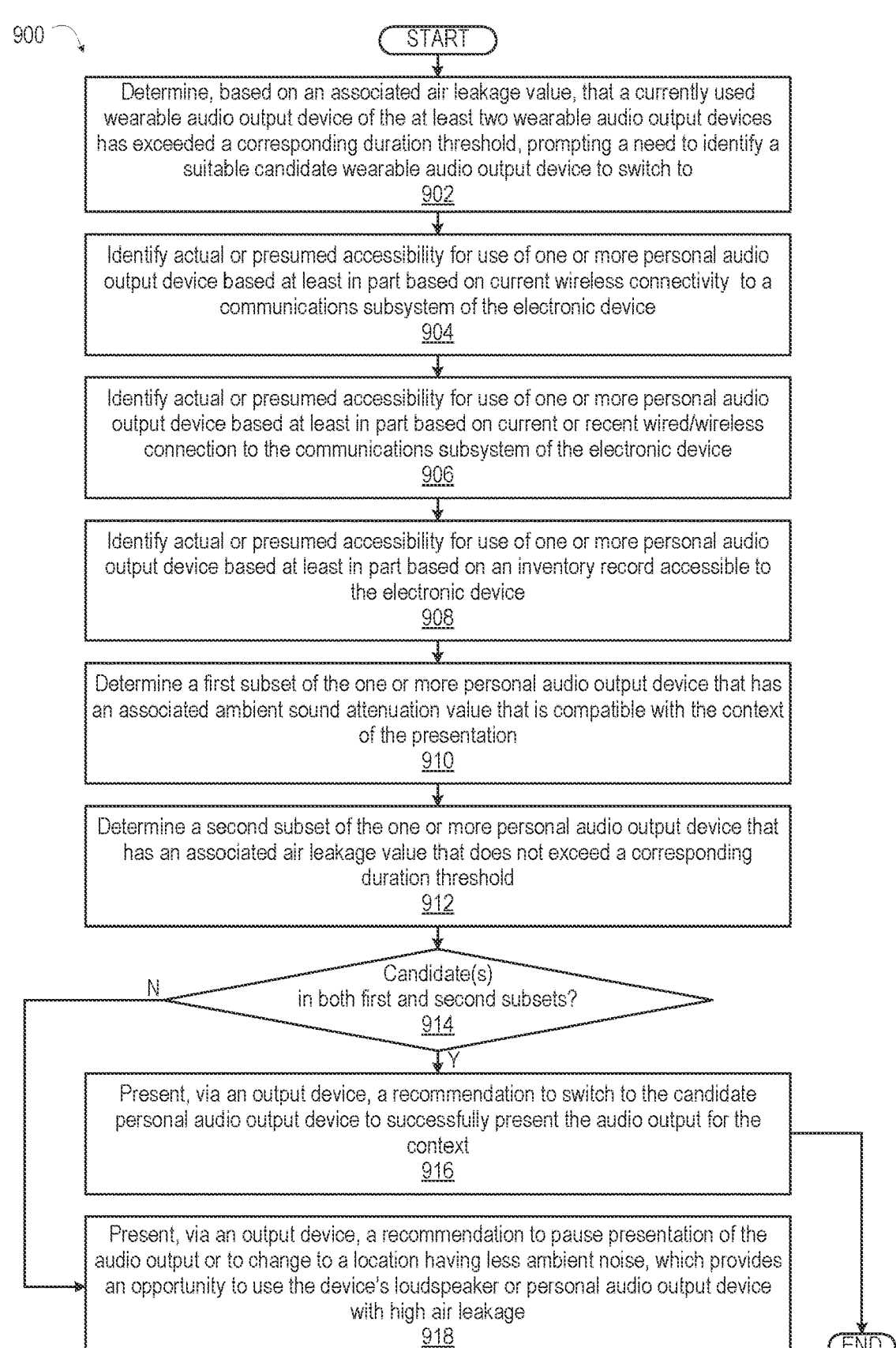
FIG. 9 is a flow diagram of a method of identifying candidate wearable audio output devices and providing other mitigating options when candidates are not available, according to one or more embodiments.

FIG. 6 is a flow diagram presenting example method 600 of providing digital wellbeing management based on context of use of connected short range wearable audio output device(s). FIG. 7 is a flow diagram presenting example method 700 of recommending a wearable audio output device (e.g., earphone, headset) that is appropriate for one or more of an ambient sound context and a sound quality of an audio output to be presented. FIG. 8 is a flow diagram of method 800 of determining sound quality requirements for selecting an appropriate wearable audio output device. FIG. 9 is a flow diagram of a method 900 of identifying candidate wearable audio output devices and providing other mitigating options when candidates are not available. The descriptions of method 600 (FIG. 6), method 700 (FIG. 7), method 800 (FIG. 8), and method 900 (FIG. 9) are provided with general reference to the specific components illustrated within the preceding FIGS. 1-5. Specific components referenced in method 600 (FIG. 6), method 700 (FIG. 7), method 800 (FIG. 8), and method 900 (FIG. 9) may be identical or similar to components of the same name used in describing preceding FIGS. 1-5. In one or more embodiments, controller 130 (FIG. 1) configures communication device 101 (FIG. 1) or a similar computing device to provide the described functionality of each of method 600 (FIG. 6), method 700 (FIG. 7), method 800 (FIG. 8), and method 900 (FIG. 9).

With reference to FIG. 6, method 600 includes monitoring (by the processor) the audio driver of an electronic device (block 602). Method 600 includes determining whether audio is being played on a wearable audio output device (decision block 604). Method 600 includes determining the wearable device type (block 606). Method 600 includes identifying the user of the wearable audio output device (block 608). In an example, the electronic device authenticates a user for access to a user interface via one or more of face recognition, voice recognition, pass code entry (e.g., verbal, touch, or gesture input), and/or fingerprint/palmprint recognition. The authenticated user is then associated with the subsequent use of the device and the wearable audio output device. Method 600 includes obtaining (or determining by summation) total cumulative wearable audio device playback session time (block 610). Method 600 includes continuously tracking and adding current audio wearable playback session time (block 612). Method 600 includes determining whether the cumulative audio wearable playback time is greater than a preset time limit (decision block 614). In response to determining that the cumulative audio wearable playback time is not greater (i.e., less than or equal to) than a preset time limit, method 600 returns to block 612. In response to determining that the cumulative audio wearable playback time is greater than a preset time limit, method

600 includes alerting the user to switch to a different device (e.g., speaker) or to stop playback (block 616). Then method 600 ends.

With reference to FIG. 7, method 700 includes communicatively coupling serially, via an audio driver and communications subsystem of an electronic device, to at least two wearable audio output devices (block 702). In one or more embodiments, method 700 may further include identifying the at least two wearable audio output devices in part based on detecting, via the communication subsystem, availability of a candidate wearable audio output device to connect to the electronic device (block 704). Method 700 includes monitoring a context of presentation of audio output via each of the at least two wearable audio output devices, the context being one or more audio characteristics from a group comprising: (i) sound quality of the presentation; and (ii) a volume level of ambient sound (block 706). Examples of determining sound quality are provided in method 800 of FIG. 8, which augments features of method 700.

With continuing reference to FIG. 7, method 700 includes associating, for each of the at least two wearable audio output devices, a respective air leakage value related to an airflow level that passes to at least one ear of a wearer (block 708). A duration of exposure to reduced airflow level is related to a risk level for moisture-related bacterial growth in the at least one ear. Assuming the ambient air is relatively drier than an interior of an ear canal, increased airflow reduces moisture in the ear, making the ear canal less conducive to bacterial growth. Method 700 includes associating, for each of the at least two wearable audio output devices, a respective ambient sound attenuation value that is designated as compatible with a range of sound quality and volume level of a corresponding context of presentation (block 710). Method 700 includes determining whether the duration of the exposure to reduced airflow level of a current one of the at least two wearable audio output devices has exceeded a duration threshold (decision block 712). In response to determining that the duration of exposure to reduced airflow level of a current in-use one of the at least two wearable audio output devices has not exceeded the duration threshold, method 700 returns to block 704. In response to determining that the duration of exposure to reduced airflow level of a current in-use one of the at least two wearable audio output devices has exceeded the duration threshold, method 700 includes identifying a candidate wearable audio output device of the at least two wearable audio output devices that has an associated air leakage value that does not exceed a corresponding duration threshold and that has an associated ambient sound attenuation value that is compatible with the context of presentation (block 714). An example of block 714 is provided below in method 900 (FIG. 9). With continuing reference to FIG. 7, method 700 includes presenting, via an output device, a recommendation to switch to the candidate wearable audio output device to mitigate the risk level while successfully presenting the audio output for the context (block 716). Then method 700 ends. In certain circumstances, constraints may exist that prevent meeting performance and risk criteria with locally available wearable audio output devices. Method 900 of FIG. 9 may augment method 900 with mitigation options.

With reference to FIG. 8, method 800 may further include determining the sound quality of the presentation of audio output based at least in part on identifying a respective type of media being presented (block 802). In an example, spoken communications may require additional attenuation of ambient noise as compared to music playback. The sound quality may depend on sound characteristics such as cadence rate of words spoken, level of annunciation, language accent, background noise captured in the audio output, etc. The type of media may suggest whether or not presentation may be paused. In an example, a live two-way may not be paused whereas a playback may be paused. Method 800 may further include associating the sound quality with a compatible volume differential between a volume level of the audio output and the ambient sound level as reduced by the associated ambient sound attenuation value (block 804). Method 800 may further include monitoring the context of presentation of audio output based at least in part on monitoring audio input received at a microphone of one of the electronic device and a current in-use wearable audio output device (block 806). Method 800 may further include distinguishing, in the audio input, the ambient sound level from the audio output leaked from the current in-use wearable audio output device (block 808). Method 800 may include monitoring the context of the presentation of the audio output based, at least in part, on determining a location of the electronic device during the presentation of the audio output (block 810). Method 800 may further include associating a known local ambient sound level corresponding to the location (block 812). In an example, the electronic device determines location based on being connected to a particular network node associated with a place of work, home, a frequented public venue, etc. In another example, the electronic device determines the location based on GPS coordinates. Although the ambient sound levels may vary at these locations, passed measurements may provide a baseline or worst-case scenario for ambient noise. User settings, such as precluding use of a loudspeaker, may be set for the specific location. Method 800 includes determining an air leakage/sound attenuation requirement for selecting a candidate wearable audio output device for the determined location (block 814). Then method 800 ends.

With reference to FIG. 9, as a precondition, method 900 includes determining, based on an associated air leakage value, that a currently used wearable audio output device of the at least two wearable audio output devices has exceeded a corresponding duration threshold, prompting a need to identify a suitable candidate wearable audio output device to switch to (block 902). Method 900 may further include identifying actual or presumed accessibility for use of one or more wearable audio output device based, at least in part, on current wireless connectivity to a communications subsystem of the electronic device (block 904). Method 900 may further include identifying actual or presumed accessibility for use of one or more wearable audio output device based, at least in part, on current or recent wired/wireless connection to the communications subsystem of the electronic device (block 906). Method 900 may further include identifying actual or presumed accessibility for use of one or more wearable audio output device based, at least in part, on an inventory record accessible to the electronic device (block 908). In an example, the inventory record is based on input(s) including: (i) prior purchases; (ii) prior connections to the electronic device; and (iii) user inputs indicating prior possession. Method 900 includes determining a first subset of the one or more wearable audio output device that has an associated ambient sound attenuation value that is compatible with the current context of the presentation (block 910). Method 900 includes determining a second subset of the one or more wearable audio output device that has an associated air leakage value that does not exceed a corresponding duration threshold (block 912). Method 900 may further include determining whether there is one or more candidate in both the first and second subsets (decision block 914). In response to determining that there is one or more candidate in both the first and second subsets, method 900 may further include presenting, via an output device, a recommendation to switch to the candidate wearable audio output device to successfully present the audio output for the current context (block 916). Then method 900 ends.

In response to determining in decision block 912 that there is no candidate in both the first and second subsets, method 900 may further include presenting, via an output device, a recommendation to pause presentation of the audio output or to change to a location having less ambient noise, which provides an opportunity to use the device's loudspeaker or wearable audio output device with high air leakage (block 918). Then method 900 ends. In one or more embodiments, the device does not have a loudspeaker. In one or more embodiments, personal privacy and prevention of noise pollution prevents use of a loudspeaker. In one or more embodiments, method 900 may further include determining that sufficient spacing to other people exists to allow use of a loudspeaker.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

an audio driver configured to communicatively couple serially to at least two wearable audio output devices; and a controller communicatively coupled to the audio driver, and which:

monitors a context of presentation of audio output via each of the at least two wearable audio output devices, the context being one or more audio characteristics of a group comprising: (i) sound quality of the presentation; and (ii) a volume level of ambient sound;

associates, for each of the at least two wearable audio output devices, a respective air leakage value related to an airflow level that passes to at least one ear of a wearer, wherein a duration of exposure to reduced airflow level is related to risk level for moisture-related bacterial growth in the at least one ear;

associates, for each of the at least two wearable audio output devices, a respective ambient sound attenuation value that is designated as compatible with a range of sound quality and volume level of a corresponding context of presentation; and in response to determining that the duration of exposure to reduced airflow level of a current one of the at least two wearable audio output devices has exceeded a duration threshold:

identifies a candidate wearable audio output device of the at least two wearable audio output devices that has an associated air leakage value that does not exceed a corresponding duration threshold and that has an associated ambient sound attenuation value that is compatible with the context of presentation; and presents, via an output device, a recommendation to switch to the candidate wearable audio output device to mitigate the risk level while successfully presenting the audio output for the context.

2. The electronic device of claim 1, wherein the controller:

in response to determining a candidate wearable audio device is not available that has an associated air leakage value that does not exceed a corresponding duration threshold, presents an alert comprising a recommendation to pause presentation of the audio output.

3. The electronic device of claim 1, wherein the controller:

in response to determining a candidate wearable audio device is not available that has an associated air leakage value that does not exceed a corresponding duration threshold:

identifies a second candidate wearable audio output device of the at least two wearable audio output devices that has an associated ambient sound attenuation value that is compatible with the context of presentation; and presents, via an output device, a recommendation to switch to the candidate wearable audio output device to successfully present the audio output for the context.

4. The electronic device of claim 1, wherein the controller:

in response to determining a candidate wearable audio device is not available that has an associated air leakage value that does not exceed a corresponding duration threshold:

identifies a user inventory of wearable audio output devices based on one or more input from a group comprising: (i) prior purchases; (ii) prior connections to the electronic device; and (iii) user inputs indicating prior possession;

identifies a third candidate wearable audio output device contained in the user inventory that has an associated air leakage value that does not exceed a corresponding duration threshold and that has an associated ambient sound attenuation value that is compatible with the context of presentation; and presents, via an output device, a recommendation to switch to the third candidate wearable audio output device to successfully present the audio output for the context.

5. The electronic device of claim 1, wherein, in monitoring the context of presentation of audio output, the controller:

monitors audio input received at a microphone of one of the electronic device and a current in-use wearable audio output device from among the at least two wearable audio output devices; and distinguishes, in the audio input, the ambient sound level from the audio output leaked from the current in-use wearable audio output device.

6. The electronic device of claim 1, wherein, in monitoring the context of the presentation of the audio output, the controller:

determines a location of the electronic device during the presentation of the audio output; and associates a known local ambient sound level corresponding to the location.

7. The electronic device of claim 1, wherein the controller:

determines the sound quality of the presentation based on identifying a respective type of media being presented; and associates the sound quality with a compatible volume differential between a volume level of the audio output and the ambient sound level as reduced by the associated ambient sound attenuation value.

8. The electronic device of claim 1, wherein the controller:

in response to determining that no candidate wearable audio output device is available to switch to:

presents a notification to move to another location having a lower ambient sound level; and identifies a candidate wearable audio output device that has both: (i) an associated air leakage value that mitigates the risk level; and (ii) the associated ambient sound attenuation value to successfully present the audio output for listening by a user in the context of the lower ambient sound level at the other location.

9. The electronic device of claim 1, further comprising:

a communication subsystem by which the electronic device communicatively couples to the at least two wearable audio output devices;

wherein the controller identifies the candidate wearable audio output device of the at least two wearable audio output devices in part based on detecting, via the communication subsystem, availability of the candidate wearable audio output device to connect to the electronic device.

10. A method comprising:

communicatively coupling serially, via an audio driver of an electronic device, to at least two wearable audio output devices;

monitoring a context of presentation of audio output via each of the at least two wearable audio output devices, the context being one or more audio characteristics of a group comprising: (i) sound quality of the presentation; and (ii) a volume level of ambient sound;

associating, for each of the at least two wearable audio output devices, a respective air leakage value related to an airflow level that passes to at least one ear of a wearer, wherein a duration of exposure to reduced airflow level is related to risk level for moisture-related bacterial growth in the at least one ear;

associating, for each of the at least two wearable audio output devices, a respective ambient sound attenuation value that is designated as compatible with a range of sound quality and volume level of a corresponding context of presentation; and in response to determining that the duration of exposure to reduced airflow level of a current one of the at least two wearable audio output devices has exceeded a duration threshold:

identifying a candidate wearable audio output device of the at least two wearable audio output devices that has an associated air leakage value that does not exceed a corresponding duration threshold and that has an associated ambient sound attenuation value that is compatible with the context of presentation; and presenting, via an output device, a recommendation to switch to the candidate wearable audio output device to mitigate the risk level while successfully presenting the audio output for the context.

11. The method of claim 10, further comprising:

in response to determining a candidate wearable audio device is not available that has an associated air leakage value that does not exceed a corresponding duration threshold, presenting an alert comprising a recommendation to pause presentation of the audio output.

12. The method of claim 10, further comprising:

in response to determining a candidate wearable audio device is not available that has an associated air leakage value that does not exceed a corresponding duration threshold:

identifying a second candidate wearable audio output device of the at least two wearable audio output devices that has an associated ambient sound attenuation value that is compatible with the context of presentation; and presenting, via an output device, a recommendation to switch to the candidate wearable audio output device to successfully present the audio output for the context.

13. The method of claim 10, further comprising:

in response to determining a candidate wearable audio device is not available that has an associated air leakage value that does not exceed a corresponding duration threshold:

identifying a user inventory of wearable audio output devices based on one or more input from a group comprising: (i) prior purchases; (ii) prior connections to the electronic device; and (iii) user inputs indicating prior possession;

identifying a third candidate wearable audio output device contained in the user inventory that has an associated air leakage value that does not exceed a corresponding duration threshold and that has an associated ambient sound attenuation value that is compatible with the context of presentation; and presenting, via an output device, a recommendation to switch to the third candidate wearable audio output device to successfully present the audio output for the context.

14. The method of claim 10, wherein monitoring the context of presentation of audio output further comprises:

monitoring audio input received at a microphone of one of the electronic device and a current in-use wearable audio output device from among the at least two wearable audio output devices; and distinguishing, in the audio input, the ambient sound level from the audio output leaked from the current in-use wearable audio output device.

15. The method of claim 10, wherein monitoring the context of the presentation of the audio output further comprises:

determining a location of the electronic device during the presentation of the audio output; and associating a known local ambient sound level corresponding to the location.

16. The method of claim 10, further comprising:

determining the sound quality of the presentation based on identifying a respective type of media being presented; and associating the sound quality with a compatible volume differential between a volume level of the audio output and the ambient sound level as reduced by the associated ambient sound attenuation value.

17. The method of claim 10, further comprising:

in response to determining that no candidate wearable audio output device is available to switch to:

presenting a notification to move to another location having a lower ambient sound level; and identifying a candidate wearable audio output device that has both: (i) an associated air leakage value that mitigates the risk level, and (ii) the associated ambient sound attenuation value to successfully present the audio output for listening by a user in the context of the lower ambient sound level at the other location.

18. The method of claim 10, further comprising:

communicatively coupling, via a communication subsystem of the electronic device, to the at least two wearable audio output devices; and identifying the candidate wearable audio output device of the at least two wearable audio output devices in part based on detecting, via the communication subsystem, availability of the candidate wearable audio output device to connect to the electronic device.

19. A non-transitory computer readable storage device; and comprising program code that when executed by a processor associated with an electronic device, configures the processor to cause the electronic device to provide functionality of:

communicatively coupling serially, via an audio driver of the electronic device, to at least two wearable audio output devices;

monitoring a context of presentation of audio output via each of the at least two wearable audio output devices, the context being one or more audio characteristics of a group comprising: (i) sound quality of the presentation; and (ii) a volume level of ambient sound;

associating, for each of the at least two wearable audio output devices, a respective air leakage value related to an airflow level that passes to at least one ear of a wearer, wherein a duration of exposure to reduced airflow level is related to risk level for moisture-related bacterial growth in the at least one ear;

associating, for each of the at least two wearable audio output devices, a respective ambient sound attenuation value that is designated as compatible with a range of sound quality and volume level of a corresponding context of presentation; and in response to determining that the duration of exposure to reduced airflow level of a current one of the at least two wearable audio output devices has exceeded a duration threshold:

identifying a candidate wearable audio output device of the at least two wearable audio output devices that has an associated air leakage value that does not exceed a corresponding duration threshold and that has an associated ambient sound attenuation value that is compatible with the context of presentation; and presenting, via an output device, a recommendation to switch to the candidate wearable audio output device to mitigate the risk level while successfully presenting the audio output for the context.

20. The computer readable storage device of claim 19, wherein the program code further configures the processor to cause the electronic device to provide functionality of:

in response to determining a candidate wearable audio device is not available that has an associated air leakage value that does not exceed a corresponding duration threshold, presenting an alert comprising a recommendation to pause presentation of the audio output.

\* \* \* \* \*